(12) United States Patent
Krishnarao et al.

(10) Patent No.: US 9,485,634 B2
(45) Date of Patent: Nov. 1, 2016

(54) SESSION MANAGED MESSAGING

(71) Applicant: CELLCO PARTNERSHIP, Basking Ridge, NJ (US)

(72) Inventors: Sharathbabu Krishnarao, Alpharetta, GA (US); MohanRamSai Gurram, Piscataway, NJ (US); Vijayalakshmi Janakiraman, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 129 days.

(21) Appl. No.: 14/144,098

(22) Filed: Dec. 30, 2013

(65) Prior Publication Data

US 2015/0189483 A1    Jul. 2, 2015

(51) Int. Cl.
*H04W 4/12* (2009.01)
*H04W 4/14* (2009.01)
*H04W 88/16* (2009.01)

(52) U.S. Cl.
CPC ............... *H04W 4/14* (2013.01); *H04W 4/12* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 7,376,139 B1 * | 5/2008 | McDonald et al. | 370/410 |
| 8,224,362 B1 * | 7/2012 | Osinga | H04W 4/14 455/466 |
| 8,391,136 B1 * | 3/2013 | Eidelson et al. | 370/228 |
| 2004/0198322 A1 * | 10/2004 | Mercer | 455/412.1 |
| 2005/0202836 A1 * | 9/2005 | Schaedler | H04W 4/14 455/466 |
| 2008/0123686 A1 * | 5/2008 | Lee | H04W 4/14 370/466 |
| 2008/0194276 A1 * | 8/2008 | Lin | H04L 61/2015 455/466 |
| 2011/0223945 A1 * | 9/2011 | Bhatnagar | 455/466 |
| 2013/0157624 A1 * | 6/2013 | Talwar | H04W 4/14 455/412.1 |

* cited by examiner

*Primary Examiner* — Lester Kincaid
*Assistant Examiner* — Daniel G Bassett

(57) ABSTRACT

Systems and methods for session managed messaging are disclosed. Some implementations include receiving, from an enterprise application and at a session manager, a messaging service message including a session ID and a phone number of a mobile device configured to receive the messaging service message, determining, at the session manager and based on the session ID, whether the messaging service message is part of a new conversation or an existing conversation between the enterprise application and the mobile device, and based on a result of the determining step, assigning a particular code to the messaging service message at the session manager, where the particular code allows the mobile device to group messaging service messages associated with a particular conversation together, and forwarding, from the session manager and to a SMS gateway, the messaging service message along with the assigned particular code.

18 Claims, 7 Drawing Sheets

SESSION MANAGED MESSAGING

BACKGROUND

Text messaging has become an increasingly desirable communications medium for enabling businesses to interact with customers. For example, short message service (SMS) messaging can be used for marketing of promotions, goods and services or to notify a customer of events such as shipments or electronic transactions.

Businesses may use software messaging applications to send short messages to customers. In some cases, such software messaging applications may exchange several messages with a user's device to conduct an interactive short message conversation with the user. While messaging applications that trigger such interactive short message conversations may know when a new short message conversation is initiated, an underlying short messaging infrastructure (e.g., SMS gateway) is not able to determine or retain intelligence regarding the status of the short message conversation. Specifically, the underlying short messaging infrastructure treats each message as a separate message unrelated to other messages in the short message conversation. At the user's device, this can result in display of short messages without a common conversational basis degrading user experience.

As the foregoing illustrates, a new approach for managing short messaging sessions may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for session managed messaging.

In some implementations, a session manager receives from an enterprise application a messaging service message (e.g., SMS message) including a session identifier ("session ID") and a phone number of a mobile station configured to receive the messaging service message. The session manager can then determine based on the session ID, whether the messaging service message is part of a new conversation or an existing conversation between the messaging application server and the mobile station. Then, based on the result of the determination, the session manager can assign a particular code (e.g., long code) to the messaging service message. The particular code can allow the mobile station to group messaging service messages associated with a particular conversation together. This is because a recipient's messaging application and/or message inbox may allow display of messages sharing a same long code (e.g., sender's phone number) as a conversational group or bunch.

The session manager may then forward to a SMS gateway, the messaging service message along with the assigned particular code. At the mobile station, messages sharing a common conversation (or that may be a part of the same conversation) may be visually displayed as a bunch, compact group or any other visual grouping format. Such a grouped display may be present, for example, in a message inbox of a messaging application executing at the mobile station.

The implementations can also include forwarding, from the session manager to the enterprise application, a transaction identifier ("transaction ID") as a part of acknowledgement for receiving the messaging service message, where the transaction ID allows the enterprise application to match a response from the mobile device to the corresponding messaging service message.

Reference now is made in detail to the examples illustrated in the accompanying drawings and discussed below.

Figure 1:
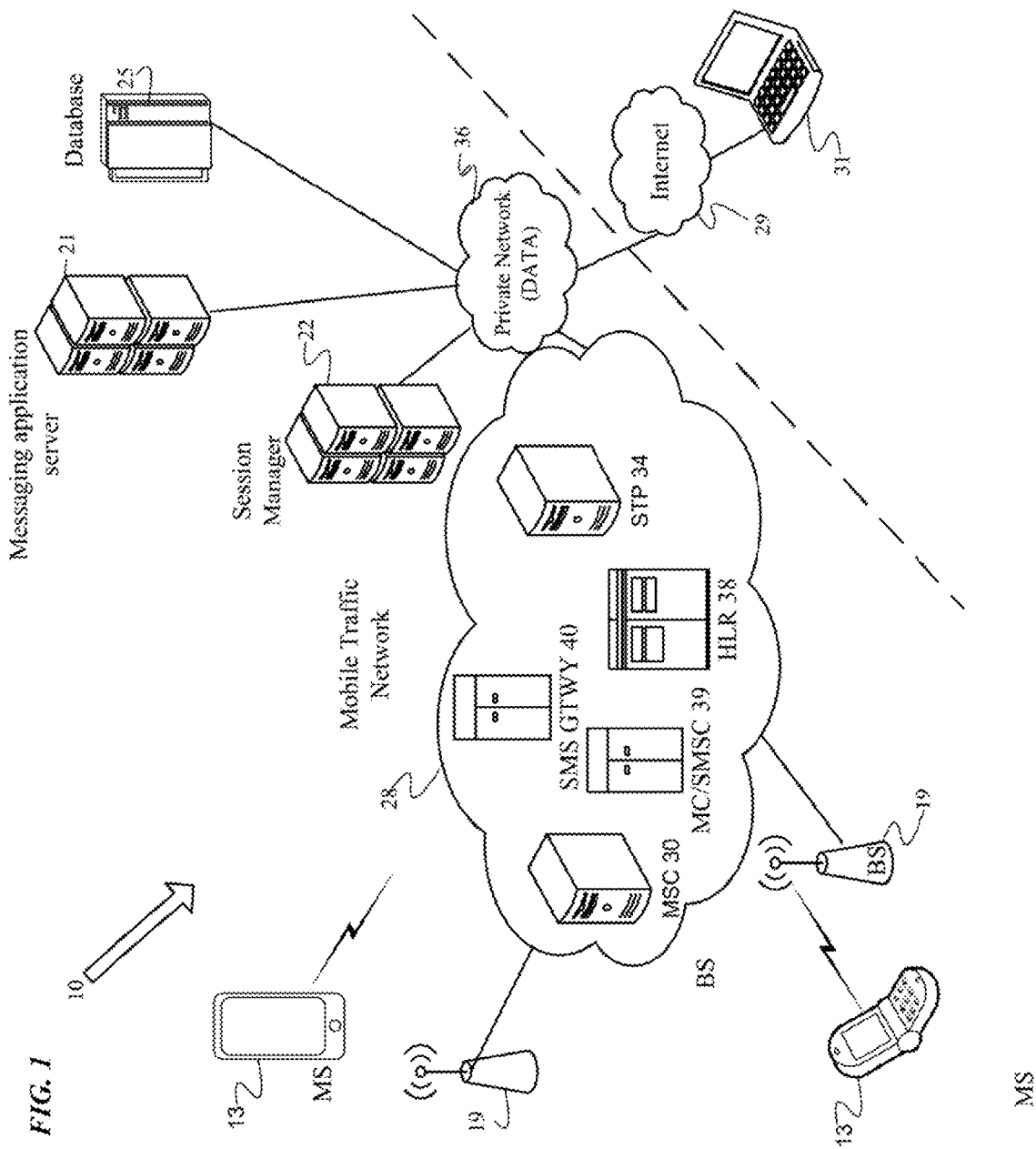
FIG. 1 is a high-level functional block diagram of an exemplary system of networks/devices that provide various communications for mobile stations and support an example of session managed short messaging.

FIG. 1 illustrates a mobile communication network 10 as may be operated by a carrier or service provider to provide a wide range of mobile communication services and ancillary services or features to its subscriber customers and associated mobile station (MS) users. The elements collectively indicated by the reference numeral 10 generally are elements of the network and are operated by or on behalf of the carrier, although the mobile stations may be sold to and owned by the carrier's customers. The mobile communication network 10 provides communications between mobile stations as well as communications for the mobile stations with networks and stations (not shown) outside the mobile communication network 10.

The wireless mobile communication network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may be capable of conventional voice telephone communications and data communications.

For purposes of later discussion, several mobile stations 13 appear in the drawing, to represent examples of the mobile stations that may receive various services via the mobile communication network 10. For example, the mobile station 13 receives and executes applications or other media content written in various programming languages. Mobile station 13 can also execute messaging applications that display messages (e.g., SMS and MMS) messages in a messaging inbox at mobile station 13. Mobile stations 13 can take the form of portable handsets, smart-phones or personal digital assistants, although they may be implemented in other form factors.

The media content can be configured to execute on many different types of mobile stations 13. For example, a mobile station application is written to execute on a binary runtime environment for mobile (BREW-based) mobile station. In further instances, a mobile station application is written to execute on a Windows Mobile based mobile station, Android, I-Phone, Java Mobile, or RIM based mobile station such as a BlackBerry or the like. These types of devices employ a multi-tasking operating system.

The mobile station 13 allows the end-user to select the media content for download to the mobile station. For example, the end-user receives a messaging service message (e.g., a SMS or MMS message) from various network elements or components in communication with the mobile communications network 10 to transmit and download desired media content for use on the mobile station(s) 13.

The mobile communication network 10 is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, includes one or more RANs and a regional circuit and/or packet switched network and associated signaling network facilities.

Physical elements of a RAN operated by one of the mobile service providers or carriers, include a number of base stations represented in the example by the base stations (BSs) 19. Although not separately shown, such a base station 19 includes a base transceiver system (BTS), which communicates via an antennae system at the site of base station and over the airlink with one or more of the mobile stations 13, when the mobile stations are within range. Each base station includes a BTS coupled to several antennae mounted on a radio tower within a coverage area often referred to as a "cell." The BTS is the part of the radio network that sends and receives RF signals to/from the mobile stations 13 that are served by the base station 19.

The radio access networks also includes a traffic network represented generally by the cloud at 28, which carries the user communications and data for the mobile stations 13 between the base stations 19 and other elements with or through which the mobile stations communicate. In some examples, the mobile traffic network 28 includes network elements that support mobile station media content transfer services such as mobile switching centers (MSCs) 30 and signal transfer points (STP) 34. The network also includes other elements that support functionality other than media content transfer services such as messaging service messages and voice communications. Examples of other network elements that may be used in support of messaging service message communications include, but are not limited to, message centers (MCs) 39, home location registries (HLRs) 38, simple messaging service (SMS) gateway 40, and other network elements such as wireless internet gateways (WIGs), and visitor location registers (VLRs) (not shown). Other individual elements such as switches and/or routers forming the traffic network 28 are omitted here form simplicity. It will be understood that the various network elements communicate with each other and other aspects of the mobile communications network 10 and other networks (e.g., the public switched telephone network (PSTN) and the Internet) either directly or indirectly.

The mobile switching center (MSC) 30 is responsible for managing communications between the mobile station and the other elements of the network 10. In addition, the MSC 30 is responsible for handling voice calls and messaging service message requests as well as other services (such as conference calls, FAX and circuit switched data, messaging service communications, Internet access, etc.). The MSC 30 sets up and releases the end-to-end connection or session, and handles mobility and hand-over requirements during the call. The MSC 30 also routes messaging service messages to/from the mobile stations 13, typically from/to an appropriate MC 39. The MSC 30 is sometimes referred to as a "switch." The MSC 30 manages the cell sites, the voice trunks, voicemail, and SS7 links.

The message center (MC) 39, in some examples, allows messaging service messages to be exchanged between mobile telephones and other networks. For SMS messaging, for example, the MC 39 receives packet communications containing text messages from originating mobile stations and forwards the messages via the signaling resources and the signaling channels to the appropriate destination mobile stations. The MC 39 may receive messages from external devices for similar delivery to mobile stations, and the MC 39 may receive similar messages from mobile station 13s and forward them to servers or terminal devices, in either case, via an Internet Protocol (IP) packet data network.

In some examples, the MC 39 can also be considered or include functionality that may be considered that of a Short Messaging Service Message Center (SMSC) or a Message Register (MR). Wireless carriers developed the short message service (SMS) to transmit text messages for display on the mobile stations. In many existing network architectures, the SMS traffic uses the signaling portion of the network 28 to carry message traffic between a Short Message Service Center (SMSC) 39 and the mobile stations. The SMSC 39 supports mobile station to mobile station delivery of text messages. However, the SMSC 39 also supports communication of messages between the mobile stations and devices coupled to other networks. For example, the SMSC 39 may receive incoming IP message packets from the Internet 29 for delivery via the network 28, one of the base stations 19 and a signaling channel over the air link to a destination mobile station. For this later type of SMS related communications, the network 10 also includes one or more SMS gateways 40.

In other examples, the MC 39 includes functionality related to the Enhanced Messaging Service (EMS) or Multimedia Messaging service (MMS). An EMS message has special text formatting (e.g., such as bold or italic), animations, pictures, icons, sound effects and special ring tones. MMS messages support the sending and receiving of multimedia messages (e.g., images, audio, video and their combinations) to (or from) MMS-enabled mobile stations. In some examples, the MC 39 is considered in whole or in part a multimedia messaging service center (MMSC).

Although a single MC 39 is shown, a network 10 has many geographically dispersed MCs 39. The MCs 39 includes destination routing tables (DRTs). In essence the DRTs are databases within the MCs 39. A DRT contains a list of the MDNs which are associated with the various MCs 39. For example, a first MDN is associated with a MC 39 in Minnesota while a second MDN is associated with a MC 39 in Virginia. The DRTs are used to determine which MC 39 should attempt to deliver an incoming messaging service message to the destination MDN. For example, if a user associated with the MC in Minnesota sends an SMS to a user associated with the MC 39 in Virginia, the Minnesota MC 39 sends the SMS to the Virginia MC 33 for delivery to the destination MDN. The communication among the MCs 39 occurs using known protocols such SMPP and the like.

The HLR 38, in some examples, stores a subscriber profile for each of the wireless subscribers and their associated mobile stations 13. The HLR 38 may reside in an MSC 30 or in a centralized service control point that communicates with the MSC(s) 30 via an out-of-band signaling system such as an SS7 network. The HLR 38 stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR 38 can also be a stand-alone device. The HLR 38 also tracks the current point of attachment of the mobile station to the network, e.g., the identification of the MSC 30 with which the mobile station is currently registered to receive service.

The visitor location register (VLR) (not shown) is, in some examples, a temporary database of the mobile stations that have roamed into the particular area which it serves. The VLRs for a region often are implemented in or in association with a MSC 30. Each base station 19 in the network is served by a single VLR, hence a subscriber cannot be present in more than one VLR at a time. The data stored in the VLR has either been received from the HLR 38, or collected from the mobile station.

The SMS gateway 40 provides functionality to transport messaging service messages to other mobile communication networks and also receive messaging service messages from other networks. The SMS gateway 40 may support communications using the SMPP protocol. SMS gateways 40 can be Short Message Peer-to-Peer gateways used to connect the wireless communication network (such as an Internal Protocol IP network on the left of the SMS Gateway 40 in FIG. 1) to another network (such as a public Internet network on the right of the SMS Gateway 40 in FIG. 1). The SMS ateway 40 allows the MC 39 to receive and send messages in IP packet format. The SMS Gateway 40 is an entity within the wireless network 10 that acts as an intermediary between the wireless service provider network and other networks. For example, the SMS Gateway 40 converts messages in protocol(s) used by other applications and devices, e.g. Extensible Markup Language (XML), Hypertext Mail Protocol (HTMP), etc., to and from the short SMPP protocol. The SMPP messages may ride on IP transport, e.g., between the SMS Gateway 40 and the MC 39. In some implementations, a personal messaging service message (e.g., SMS) can originate from mobile station 13, pass through mobile traffic network 28 and arrive at another target mobile station. A response to the personal message back to mobile station 13 may also follow the same route used to send the message. In some implementations, enterprise messages destined for mobile station 13 can originate from messaging application server 21, travel through the private network 36 to mobile traffic network 28, and arrive at mobile station 13.

Responses to the enterprise messages from mobile station 13 can be routed by SMS gateway 40 to session manager 22 via private network 36.

In addition, the traffic network portion 28 of the mobile communications network 10 connects to a private data network 36. The private data network 36 connects to the traffic network portion 28 via a gateway (not shown). The gateway provides protocol conversions between the protocols used by the traffic network 28 and the protocols used by the private data network 36.

The private data network 36 is in communication with various auxiliary services servers, e.g., such as those providing additional services to the users of the network 10, and/or to operations support personnel of the service provider or carrier that operates the network 10.

In an aspect private data network 36 is in communication with session manager 22 and messaging application server 21.

Messaging application server 21 can include an enterprise application that manages messaging conversations or sessions. As an example, messaging application server 21 may initiate transmission of messages to mobile station 13.

In an aspect, session manager 22 allows messaging application server 21 and mobile station 13 to uniquely identify short messages provided by messaging application server 21 for purposes that include, but are not limited to, grouped display of short messages sharing a common conversation at mobile station 13.

For example, in one aspect, session manager 22 receives from messaging application server 21 a messaging service message including a session ID and a phone number of a mobile station 13 configured to receive the messaging service message. Session manager 22 can then determine based on the session ID, whether the messaging service message is part of a new conversation or an existing conversation between messaging application server 21 and mobile station 13. Then, based on the result of the determining step, session manager 22 can assign a particular code (e.g., long code) to the messaging service message. The particular code can allow mobile station 13 to group messaging service messages associated with a particular conversation together. This is because a recipients messaging application and/or message inbox may allow display of messages sharing a same long code (e.g., sender's phone number) as a conversational group or bunch.

Session manager 22 may then forward to a SMS gateway 40, the messaging service message along with the assigned particular code. At mobile station 13, messages sharing a common conversation (or that may be a part of the same conversation) may be visually displayed as a bunch, compact group or any other visual grouping format. Such a grouped display may be present, for example, in a message inbox of a messaging application executing at mobile station 13.

Those skilled in the art presumably are familiar with the structure, programming and operations of the various type of mobile stations. However, for completeness, it may be useful to consider the functional elements/aspects of two exemplary mobile stations 13a and 13b, at a high-level. While the present disclosure is discussed generally with reference to short messages and/or text messages it is to be appreciated that the disclosed implementations are not limited to short messages and/or text messages and can be applied to any form of messaging and communication, including, but not limited to, video, audio, multimedia or any combination thereof.

Figure 2:
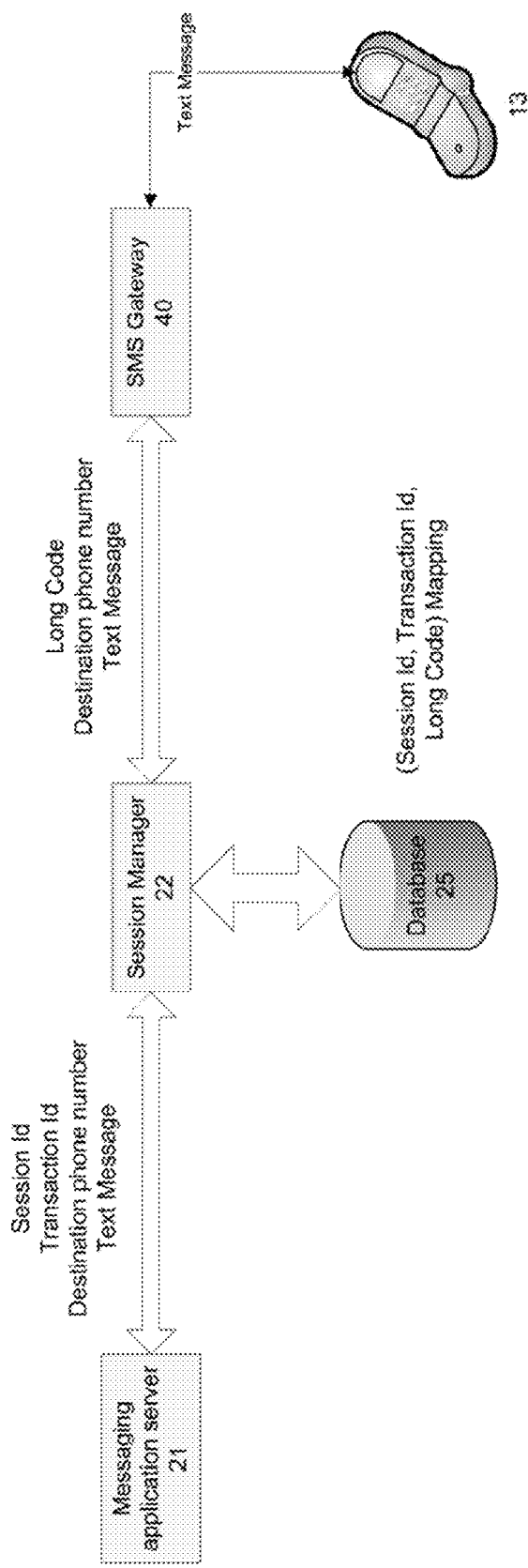
FIG. 2 illustrates an exemplary environment for session managed short messaging, according to aspects of the disclosure.

FIG. 2 illustrates an exemplary environment 200 for session managed short messaging, according to aspects of the disclosure. The exemplary environment 200 includes messaging application server 21, session manager 22, SMS gateway 40, mobile station 13 and database 25. In some implementations, messaging application server 21 may execute an enterprise application that manages messaging conversations or sessions. In some implementations, messaging application server 21 may initiate transmission of messages to mobile station 13. These messages may be associated, for example, with a marketing campaign by a company or organization interacting with messaging application server 21. Such an example campaign, performed over messaging service messages to user's mobile device, can allow the user to preview, buy and/or subscribe to one or more products and services. Messaging application server 21 may also receive messages from the user via the user's mobile device that respond to one or more messages provided by messaging application server 21.

In some implementations, messaging application server 21 initiates a message conversation with mobile station 13. Such a message conversation can be, for example, a part of a marketing campaign and may include one or more messages (e.g., text, multimedia messages, etc.) exchanged with mobile station 13 or any other device capable of receiving communication from messaging application server 21. Messaging application server 21 may simultaneously (or sequentially) initiate and conduct one or more messaging service message conversations with mobile station 13 and other devices.

In some implementations, messaging application server 21 provides a messaging service message including a session ID and a phone number of a mobile device configured to receive the messaging service message. Messaging application server 21 may also provide a transaction ID that uniquely identifies a short message within a short message conversation. When a message is received at session manager 22, session manager 22 may provide an acknowledgement of the message to messaging application server 21. Example acknowledgements are discussed below with respect to FIG. 3.

In some implementations, messaging application server 21 may provide a user interface that allows a user (e.g., a marketing campaign administrator) to input a message that is to be provided to mobile station 13 via session manager 22 and SMS gateway 40. Messaging application server 21 may also allow a user to track progress of messages that have been provided by messaging application server 21.

In some implementations, messaging application server 21 may generate and provide a session identifier to session manager 22. The session identifier can identify a short message conversation initiated by messaging application server 21. Session identifiers may be unique to each short message conversation initiated by messaging application server 21. Messages having a common session identifier may be determined to share a common message conversation even if the messages are sent separately at different time intervals or interspersed with messages having different session identifiers. In other words, messages sharing the same session identifier belong to the same conversation and can be displayed together or as a group at a recipient's mobile device.

In some implementations, session manager 22 may be configured to associate a transaction identifier with one or more messages provided by messaging application server 21. A transaction identifier may uniquely identify a short message (e.g., text message) within a short message conversation initiated by messaging application server 21. The transaction identifier may be generated by messaging application server 21 or by session manager 22. In a non-limiting implementation, when a transaction identifier may not be generated by messaging application server 21, session manager 22 may generate a transaction identifier on behalf of messaging application server 21 and provide the generated transaction identifier to messaging application server 21 as an acknowledgement for a messaging service message provided by messaging application server 21. A transaction identifier can be sent back to messaging application server 21 with a responding short message (e.g., sent back as an asynchronous call back) when a user at mobile station 13 responds to an original message provided by messaging application server 21. Such operation allows messaging application server 21 to identify the original message that resulted in the responding message, enabling messaging application server 21 to take steps to further or terminate the short message conversation.

In some implementations, session manager 22 can enable messaging application server 21 to manage origin addresses for messages that originate at messaging application server 21. An origin address can be a phone number (or any identifier) that is used originate transmission of a short message provided by messaging application server 21. A short message can be transmitted from an origin address provided by messaging application server 21 to a destination address (e.g., phone number) of mobile station 13. An origin address can be displayed (at mobile station 13) as a phone number originating the message provided by messaging application server 21. Origin addresses may, for example, include short codes and/or long codes. A long code may be a phone number that can be enabled to send and receive text messages to and from cell phone numbers. A short code can be a shorter number (or any alphanumeric string), such as, and for example, a 5-7-digit number, that may or may not spell out a word and is generally used for short message marketing campaigns. While the following implementations are discussed with reference to long codes, it is to be appreciated that the disclosed implementations are not limited to long codes and any other origin codes including short codes may be used.

Long codes may be provided from a repository or pool of long codes at SMS gateway 40 or any other part of a messaging infrastructure. In some implementations, messaging application server 21 is allocated a one or more long codes from a pool or repository of long codes. In a non-limiting example, long codes may be sequentially selected for use in order of their appearance in the long code repository. As an example long codes 1-n, may be arranged beginning from long code 1 through long code n, where long code 1 is the first long code in the long code repository and long code n is the last long code in the long code repository. As an example, after long code n has been used to provide a message to mobile station 13, session manager 22 may return to the top of the long code repository and provide long code 1 to messaging application server 21 when messaging application server 21 may need a new long code. In some implementations, distinct pools of long codes may exist for different marketing campaigns. This example is purely illustrative and is not intended to limit the disclosed embodiments. These different long code pools may be accessed by different messaging application servers 21. It is to be appreciated that the disclosed implementations are not limited to a single messaging application server 21 and can include a plurality of messaging application servers 21. Such a plurality of messaging application servers may engage in concurrent or parallel messaging service message conversations with a subscriber or any other component of FIG. 1.

In some implementations, session manager 22 receives from messaging application server 21 a messaging service message including a session ID and a phone number of a mobile station 13 configured to receive the messaging service message. Session manager 22 can then determine based on the session ID, whether the messaging service message is part of a new conversation or an existing conversation between messaging application server 21 and mobile station 13. Then, based the result of the determining step, session manager 22 can assign a particular code (e.g., long code) to the messaging service message. The particular code can allow mobile station 13 to group messaging service messages associated with a particular conversation together. Session manager 22 may then forward to a SMS gateway 40, the messaging service message along with the assigned particular code. At mobile station 13, messages sharing a common conversation (or that may be a part of the same conversation) may be visually displayed as a bunch, compact group or any other visual grouping format. Such a grouped display may be present, for example, in a message inbox of a messaging application executing at mobile station 13. This is because a recipients messaging application and/or message inbox may allow display of messages sharing a same long code (e.g., sender's phone number) as a conversational group or bunch.

In some aspects, upon determining that the messaging service message is part of a new conversation, session manager 22 can assign a first long code from a plurality of long codes for the enterprise messaging application server 21 to the messaging service message. However, upon determining that the messaging service message is part of the existing conversation, session manager 22 can retrieve a long code previously allocated to the session ID and assign the retrieved long code to the messaging service message.

In some aspects, upon determining that the messaging service message is part of a new conversation, session manager 22 can determine whether there is a previous message sent from the messaging application server 21 to mobile station 13. Upon determining that there is a previous message sent from the enterprise application to mobile station 13, session manager 22 can retrieve last allocated long code for mobile station 13 and assign the last allocated long code to the messaging service message.

In some aspects, session manager 22 determines whether the messaging service message includes a transaction ID. Upon determining that the messaging service message does not include a transaction ID, session manager 22 assigns a transaction ID to the messaging service message and forwards, to messaging application server 21, the transaction ID as a part of acknowledgement for receiving the messaging service message. The transaction ID can allow messaging application server 21 to match a response from mobile station 13 to the corresponding messaging service message.

In this way, by assigning and re-using long codes for messaging service messages, session manager 22 enables messaging application server 21 and mobile station 13 to uniquely identify messaging service messages (e.g., SMS messages) provided by messaging application server 21 for purposes that include, but are not limited to, grouped display of short messages sharing a common conversation at mobile station 13. For example, messages sharing a common conversation (or that may be a part of the same conversation) may be visually displayed as a bunch, compact group or any other visual grouping format. Such a grouped display may be present, for example, in a message inbox of a messaging application executing at mobile station 13.

Grouping of short messages enabled by session manager 22 can significantly improve user efficiency and experience. Consider an example scenario where messaging application server 21 has sent an initial message regarding a marketing campaign to a user at mobile station 13. However, the user is unable to view and/or respond to the message for over 24 hours. Then, as an example, messaging application server 21 may send a reminder message with the same long code that may have been associated with the initial message. Because the same long code is associated with the reminder message, a previously allocated long code is used to transmit the reminder message. This allows the reminder message to be displayed in a message inbox next or adjacent to the initial message. Such grouped display of messages can help a customer better relate to the initial message that may have been provided a long time ago (e.g., over 24 hours ago), increasing chances of a user or customer responding to the initial message. Furthermore, such grouped display may allow the customer to delete a message conversation in its entirety by selecting the conversation rather than delete individual messages.

In some implementations, database 25 can store mappings or associations between session identifiers, transaction identifiers, long codes and any other data that may be utilized by and exchanged between the components of FIG. 2. For example, database 25 may store an example mapping in the form of a "session identifier—transaction identifier—long code" for messages that are provided by messaging application server 21. This example is purely illustrative and is not intended to limit the disclosed implementations. Other mappings and combinations may be possible with any data exchanged between components of the implementations. In some non-limiting implementations, session information in database 25 may be purged or edited after a predetermined number of days (e.g., 30 days) or any other time period. After such a purge, future requests from messaging application server 21 that are associated with the same session identifier may be considered to be a new session request and a new long code may be allocated by session manager 22.

In some implementations, if messaging application server 21 is executing one or more separate short message conversations, each conversation may be associated with a distinct session identifier. For example, short message conversation 1 may be associated with session identifier 1 and short message conversation 2 may be associated with session identifier 2. Furthermore, for example, short message conversation 1 may be associated with marketing campaign 1 and short message conversation 2 may be associated with a separate marketing campaign 2. The disclosed implementations can work with any number of marketing campaigns associated with any number of short message conversations further including any number of short messages.

Figure 3:
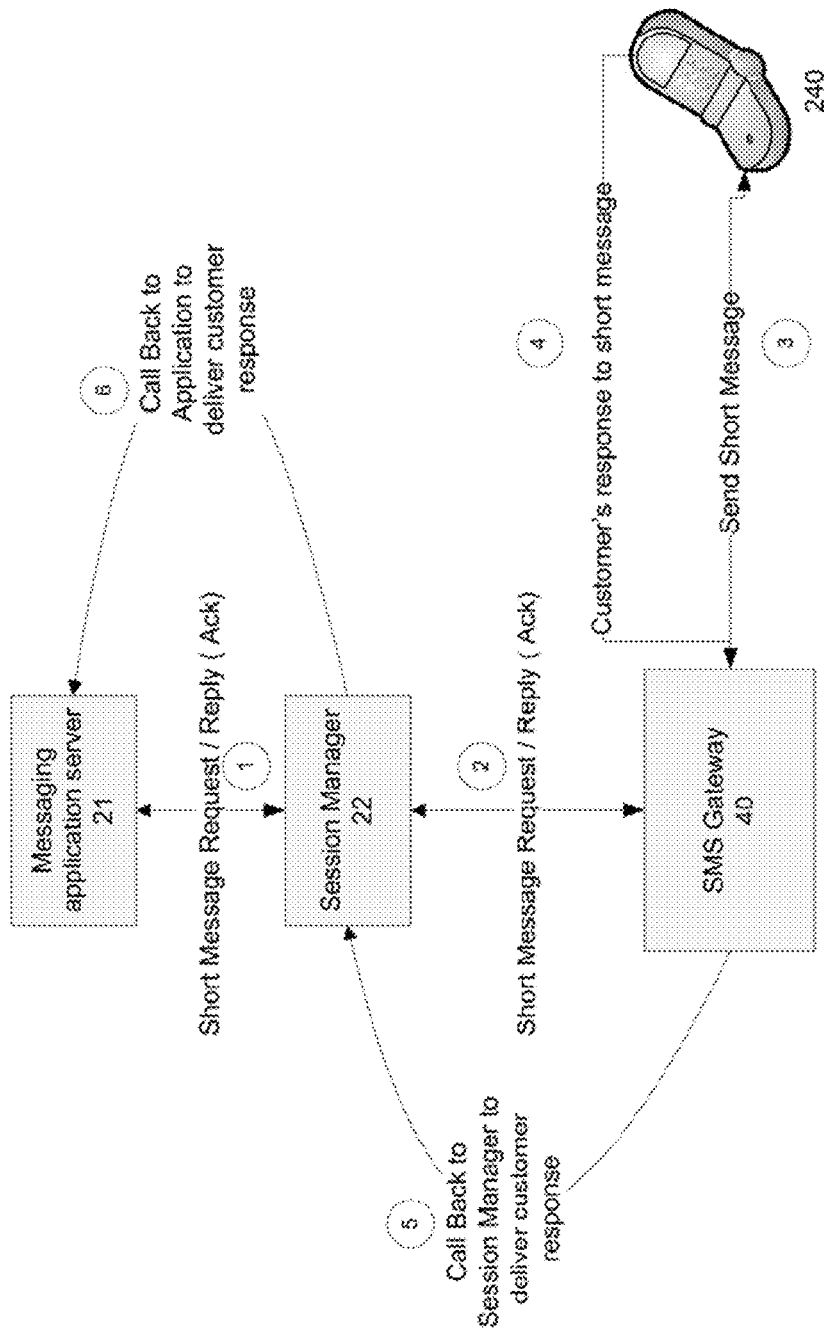
FIG. 3 is an exemplary diagram illustrating interactions between components of the environment shown in FIG. 2.

FIG. 3 is an exemplary diagram illustrating example data acknowledgements and callbacks between messaging application server 21, session manager 22, SMS gateway 40 and mobile station 13 during session managed short messaging. For example, in stage 1, messaging application server 21 may provide a short message to session manager 22 and receive an acknowledgement from session manager 22. In stage 2, session manager 22 may provide the short message to SMS gateway 40 and receive an acknowledgement from SMS gateway 40. In stage 3, the short message can be forwarded to mobile station 13. In stage 4, mobile station 13 may transmit a responding short message provided by a user of mobile station 13. In stage 5, SMS gateway 40 can make a callback to session manager 40 to deliver the response from mobile station 13 to session manager 40. In stage 6, session manager 40 can make a callback to messaging application server 21 to deliver the customer response to messaging application server 21. The interactions illustrated in FIG. 3 are not intended to limit the disclosed implementations.

Figure 4A:
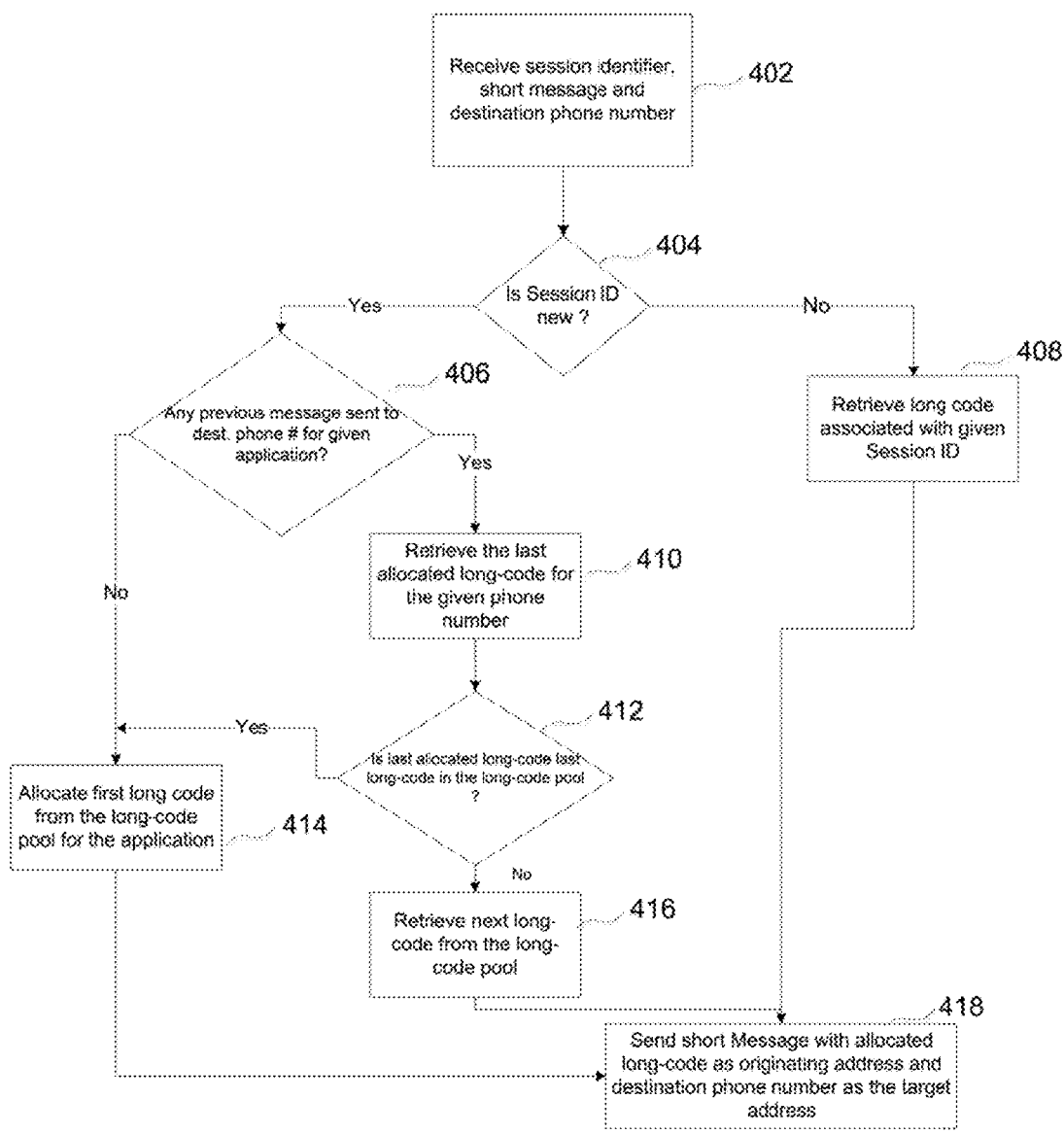
FIGS. 4A and 4B illustrate exemplary processes for session managed short messaging, according to aspects of the disclosure.

FIG. 4A illustrates an exemplary process 400 at session manager 22, according to an implementation. Process 400 begins with receiving a session identifier, short message and a destination phone number in a request for a short message conversation from a messaging application (step 402). As an example, such a request may be received from messaging application server 21 when messaging application server 21 provides a first short message to session manager 22 that includes a session identifier and a phone number associated with a recipient's device, such as, mobile station 13. Additionally, session manager 22 may also receive a transaction identifier from messaging application server 21.

Process 400 determines if the session identifier received in step 402 is a new or previously unused session identifier (step 404). If the session identifier received in step 402 is not a new or previously unused session identifier (No, step 404), then a long code presently associated with the session identifier may be retrieved (step 408). As an example, session manager 22 may retrieve a long code presently associated with the session identifier from database 25. Then, the short message is transmitted with the long code retrieved in step 408 as a long code and the destination phone number as a target address (step 418). As an example, messaging application server 21 may transmit the text message to mobile station 13 over SMS gateway 40.

Returning to step 404, if the session identifier received in step 404 is a new or previously unused session identifier (Yes, step 404), then process 400 proceeds to determine if at least one message was previously transmitted from the application to the destination phone number of step 402 (step 406).

If no message was previously transmitted from the application to the phone number of step 402 (No, step 406), then a first available long code from a long code pool is allocated as a long code to the application. As an example, session manager 22 may select any first available long code as a long code. However, if at least one message was previously transmitted from the application to the destination phone number of step 402 (Yes, step 406), a long code last associated with the phone number of step 402 can be retrieved (step 410). As an example, session manager 22 may retrieve a long code last associated with the phone number of device 240 from database 25.

Process 400 proceeds to step 412 where it is determined if the last associated long code is the last available long code in the long code pool. If the last associated long code is the last available long code in the long code pool (Yes, step 412), then process 400 allocates the first long code from the long code repository (step 414) and a text message is transmitted with the long code retrieved in step 414 as a long code and the phone number of step 402 as a target address (step 418). As discussed above, and in some implementations, messaging application server 21 can be allocated a one or more long codes from a pool or repository of long codes. In a non-limiting example, long codes may be sequentially selected for use in order of their appearance in the long code repository. As an example long codes 1-n, may be arranged beginning from long code 1 through long code n, where long code 1 is the first long code in the long code repository and long code n is the last long code in the long code repository.

As an example, after long code n has been used to provide a message to mobile station 13, session manager 22 may return to the top of the long code repository and provide long code 1 to messaging application server 21 when messaging application server 21 may need a new long code. This example is purely illustrative and is not intended to limit the disclosed embodiments.

Returning to step 412, if the last allocated long is not the last available long code in the long code pool (No, step 412), then process 400 retrieves a next available long code from the long code pool (step 416) and a text message is transmitted with the long code retrieved in step 416 as a long code and the phone number of step 402 as a target address (step 418).

Figure 4B:
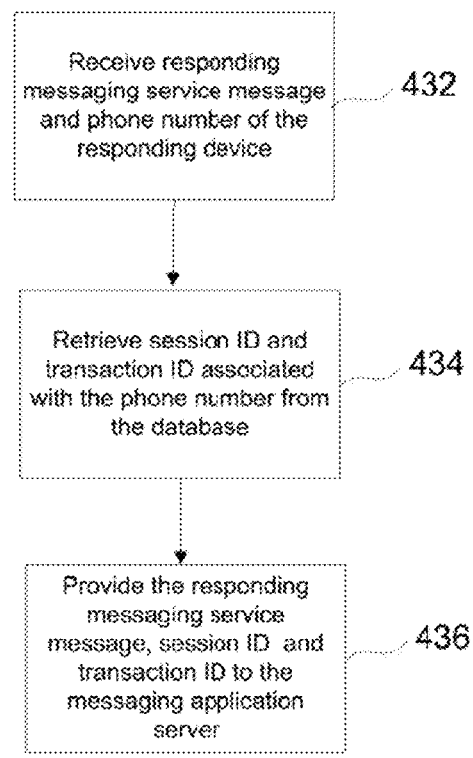

FIG. 4B illustrates an exemplary process 430 at session manager 22, according to an implementation. Process 430 begins with receiving a responding messaging service message and responding phone number (step 432). As an example, such a responding message may be received at session manager 22 when a user of mobile station 13 provides a response to a message originating from messaging application server 21. Method 430 proceeds by retrieving a session ID and transaction ID associated with the responding phone number (step 434). As an example, session manager 22 may retrieve a session ID and transaction ID that may have been previously associated with the responding phone number from database 25.

Then, the responding messaging service message, the session ID and the transaction ID are provided to a messaging application server. As an example, session manager 22 can provide the session ID and the transaction ID and the responding service message to messaging application server. By reviewing the session ID, the messaging application server 21 may determine a conversation to which the responding messaging service message belongs.

Figure 5:
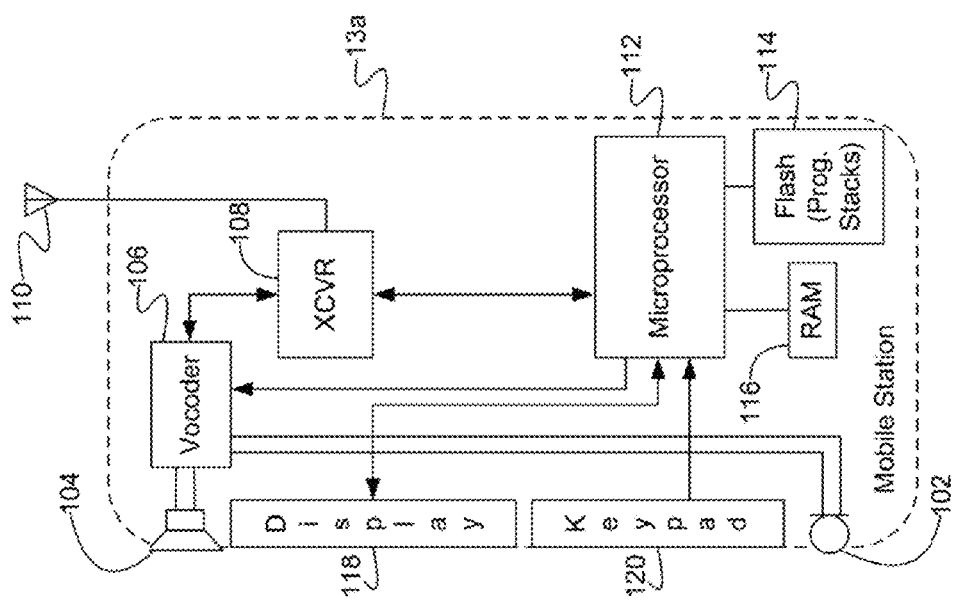
FIG. 5 is a high-level functional block diagram of an exemplary non-touch type mobile station as may utilize the session managed messaging service through a network/system like that shown in FIG. 1.

For purposes of such a discussion, FIG. 5 provides a block diagram illustration of an exemplary non-touch type mobile station 13a. Although the mobile station 13a may be a smart-phone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass embodiments of the mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13a includes a display 118 for displaying messages, menus or the like, call related information dialed by the user, calling party numbers, etc., including messages grouped in accordance with their respective conversations for the session-managed short messaging service. A keypad 120 allows dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during grouped display of short messages sharing a common conversation.

A microprocessor 112 serves as a programmable controller for the mobile station 13a, in that it controls all operations of the mobile station 13a in accord with programming that it executes, for all normal operations, and for operations involved in the grouped display of short messages sharing a common conversation under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13a includes a processor, and programming stored in the flash memory 114 configures the processor so that the mobile station is capable of performing various desired functions, including in this case the functions involved in the technique for providing grouped display of messages sharing a common conversation.

Figure 6:
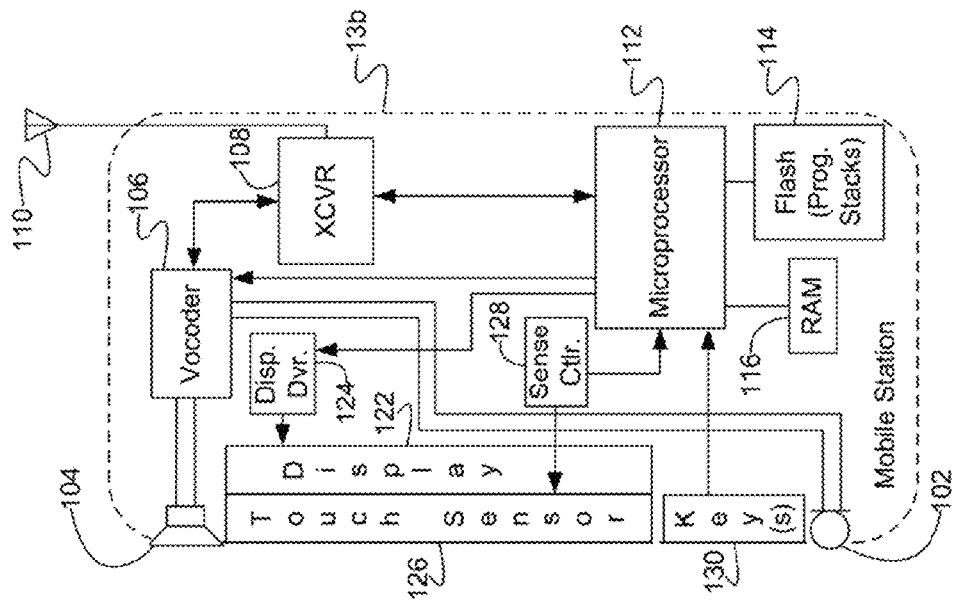
FIG. 6 is a high-level functional block diagram of an exemplary touch screen type mobile station as may utilize the session managed messaging service through a network/system like that shown in FIG. 1.

For purposes of such a discussion, FIG. 6 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 3. For example, the touch screen type mobile station 13b includes a microphone 102, speaker 104 and vocoder 106, for audio input and output functions, much like in the earlier example. The mobile station 13b also includes a at least one digital transceiver (XCVR) 108, for digital wireless communications, although the handset 13b may include an additional digital or analog transceiver. The concepts discussed here encompass embodiments of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13b, in that it controls all operations of the mobile station 13b in accord with programming that it executes, for all normal operations, and for operations involved in the grouped display of messages sharing a common conversation. In the example, the mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, outlined above, the mobile station 13b includes a processor, and programming stored in the flash memory 114 configures the processor so that the mobile station is capable of performing various desired functions, including in this case the functions involved in the technique for providing grouped display of messages sharing a common conversation.

In the example of FIG. 6, the user interface elements included a display and a keypad. The mobile station 13b may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface allows a user to interact directly with the information presented on the display.

Hence, the exemplary mobile station 13*b* includes a display 122, which the microprocessor 112 controls via a display driver 124, to present visible outputs to the device user. The mobile station 13*b* also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provide touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13*b*. The microphone 102 and speaker 104 may be used as additional user interface elements, for audio input and output, including with respect to some functions related to grouped display of messages sharing a common conversation.

The structure and operation of the mobile stations 13*a* and 13*b*, as outlined above, were described to by way of example, only.

As shown by the above discussion, functions relating to the an enhanced message grouping experience for the session managed messaging service, via a graphical user interface of a mobile station may be implemented on computers connected for data communication via the components of a packet data network, operating as device 13*a* and/or as servers 25 as shown in FIG. 1. Although special purpose devices may be used, such devices also may be implemented using one or more hardware platforms intended to represent a general class of data processing device commonly used to run "server" programming so as to implement the session managed short messaging functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for session managed short messaging. The software code is executable by the general-purpose computer that functions as a session manager and/or that functions as a mobile station device. In operation, the code is stored within the general-purpose computer platform. At other times, however, the software may be stored at other locations and/or transported for loading into the appropriate general-purpose computer system. Execution of such code by a processor of the computer platform allows the platform to implement the methodology for session managed short messaging, in essentially the manner performed in the implementations discussed and illustrated herein.

Figures 7, 8:
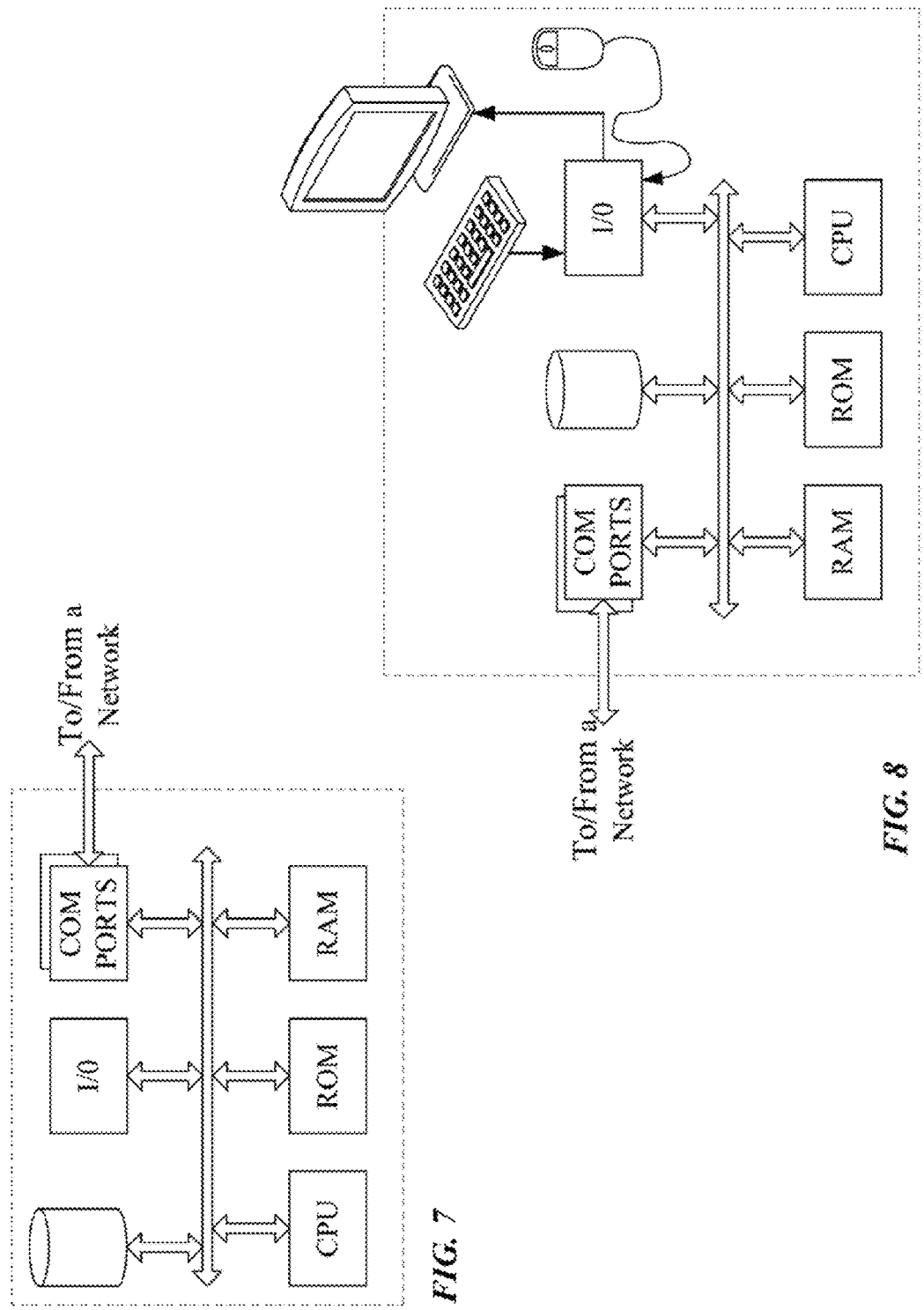
FIG. 7 is a simplified functional block diagram of a computer that may be configured as a host or server, for example, to function as the session manager in the system of FIG. 2.
FIG. 8 is a simplified functional block diagram of a personal computer or other work station or terminal device.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker allow audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of session managed short messaging outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may allow loading of the software from one computer or processor into another, for example, from a management server or host computer of the messaging service provider into the computer platform of the session manager. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the grouped display of text messages, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter

What is claimed is:

1. A method comprising:
   receiving, from an enterprise application and at a session manager, a messaging service message including a session ID and a phone number of a mobile device configured to receive the messaging service message;
   determining, at the session manager and based on the session ID, whether the messaging service message is part of a new conversation or an existing conversation between the enterprise application and the mobile device;
   based on a result of the determining step, assigning a particular code to the messaging service message at the session manager, the particular code allowing the mobile device to group messaging service messages associated with a particular conversation together;
   forwarding, from the session manager and to a SMS gateway, the messaging service message along with the assigned particular code;
   determining whether the messaging service message includes a transaction ID;
   upon determining that the messaging service message does not include a transaction ID,
   assigning a transaction ID to the messaging service message; and
   forwarding, from the session manager to the enterprise application, the transaction ID as a part of acknowledgement for receiving the messaging service message, the transaction ID allows the enterprise application to match a response from the mobile device to the corresponding messaging service message.

2. The method of claim 1, wherein the messaging service message includes a Short Messaging Service (SMS) message or a Multimedia Messaging Service (MMS) message.

3. The method of claim 1, wherein the particular code includes a long code.

4. The method of claim 3, wherein upon determining that the messaging service message is part of the new conversation, assigning at the session manager a first long code from a plurality of long codes for the enterprise application to the messaging service message.

5. The method of claim 3, wherein upon determining that the messaging service message is part of the existing conversation, retrieving the long code previously allocated to the session ID and assigning the retrieved long code to the messaging service message.

6. The method of claim 3, wherein upon determining that the messaging service message is part of the new conversation, the method further comprises steps of:
   determining whether there is a previous message sent from the enterprise application to the mobile device; and
   upon determining that there is a previous message sent from the enterprise application to the mobile device, retrieving last allocated long code for the mobile device and assigning the last allocated long code to the messaging service message.

7. A server comprising:
   a communication interface configured to enable communication via a mobile network;
   a processor coupled with the communication interface;
   a storage device accessible to the processor; and
   an executable program in the storage device, wherein execution of the program by the processor configures the server to perform functions, including functions to:
   receive, from an enterprise application and at a session manager, a messaging service message including a session ID and a phone number of a mobile device configured to receive the messaging service message;
   determine, at the session manager and based on the session ID, whether the messaging service message is part of a new conversation or an existing conversation between the enterprise application and the mobile device;
   based on a result of the determining step, assign a particular code to the messaging service message at the session manager, the particular code allowing the mobile device to group messaging service messages associated with a particular conversation together;
   forward, from the session manager and to a SMS gateway, the messaging service message along with the assigned particular code;
   determine whether the messaging service message includes a transaction ID;
   upon determining that the messaging service message does not include a transaction ID, assign a transaction ID to the messaging service message; and
   forward, from the session manager to the enterprise application, the transaction ID as a part of acknowledgement for receiving the messaging service message, the transaction ID allows the enterprise application to match a response from the mobile device to the corresponding messaging service message.

8. The server of claim 7, wherein the messaging service message includes a Short Messaging Service (SMS) message or a Multimedia Messaging Service (MMS) message.

9. The server of claim 7, wherein the particular code includes a long code.

10. The server of claim 9, wherein upon determining that the messaging service message is part of the new conversation, execution of the program by the processor configures the server to perform functions includes further functions to: assign at the session manager a first long code from a plurality of long codes for the enterprise application to the messaging service message.

11. The server of claim 9, wherein upon determining that the messaging service message is part of the existing conversation, execution of the program by the processor configures the server to perform functions includes furhter functions to: retrieve the long code previously allocated to the session ID and assign the retrieved long code to the messaging service message.

12. The server of claim 9, wherein upon determining that the messaging service message is part of the new conversation, execution of the program by the processor configures the server to perform functions including further functions to:
   determining whether there is a previous message sent from the enterprise application to the mobile device; and
   upon determining that there is a previous message sent from the enterprise application to the mobile device, retrieving last allocated long code for the mobile device and assigning the last allocated long code to the messaging service message.

13. A non-transitory computer-readable medium comprising instructions which, when executed by one or more computers, cause the one or more computers to perform operations including:
   receiving, from an enterprise application and at a session manager, a messaging service message including a session ID and a phone number of a mobile device configured to receive the messaging service message;
   determining, at the session manager and based on the session ID, whether the messaging service message is part of a new conversation or an existing conversation between the enterprise application and the mobile device;
   based on a result of the determining step, assigning a particular code to the messaging service message at the session manager, the particular code allowing the mobile device to group messaging service messages associated with a particular conversation together;
   forwarding, from the session manager and to a SMS gateway, the messaging service message along with the assigned particular code
   determining whether the messaging service message includes a transaction ID;
   upon determining that the messaging service message does not include a transaction ID, assigning a transaction ID to the messaging service message; and
   forwarding, from the session manager to the enterprise application, the transaction ID as a part of acknowledgement for receiving the messaging service message, the transaction ID allows the enterprise application to match a response from the mobile device to the corresponding messaging service message.

14. The computer-readable medium of claim 13, wherein the messaging service message includes a Short Messaging Service (SMS) message or a Multimedia Messaging Service (MMS) message.

15. The computer-readable medium of claim 13, wherein the particular code includes a long code.

16. The computer-readable medium of claim 15, wherein upon determining that the messaging service message is part of the new conversation, the instructions further cause the one or more computers to perform operations including:

assigning at the session manager a first long code from a plurality of long codes for the enterprise application to the messaging service message.

17. The computer-readable medium of claim 15, wherein upon determining that the messaging service message is part of the existing conversation, the instructions further cause the one or more computers to perform operations including: retrieving the long code previously allocated to the session ID and assigning the retrieved long code to the messaging service message.

18. The computer-readable medium of claim 15, wherein upon determining that the messaging service message is part of the new conversation the instructions further cause the one or more computers to perform operations including:
   determining whether there is a previous message sent from the enterprise application to the mobile device; and
   upon determining that there is a previous message sent from the enterprise application to the mobile device, retrieving last allocated long code for the mobile device and assigning the last allocated long code to the messaging service message.

\* \* \* \* \*